(12) United States Patent
Benda et al.

(10) Patent No.: US 7,272,962 B2
(45) Date of Patent: Sep. 25, 2007

(54) CABLE LOCKOUT ASSEMBLY

(75) Inventors: Steven J. Benda, Cokato, MN (US); Keith R. Bound, Rugby (GB); Steven N. Kisch, Zimmerman, MN (US)

(73) Assignee: Brady Worldwide, Inc., Milwaukee, WI (US)

( * ) Notice: Subject to any disclaimer, the term of this patent is extended or adjusted under 35 U.S.C. 154(b) by 213 days.

(21) Appl. No.: 10/938,452

(22) Filed: Sep. 10, 2004

(65) Prior Publication Data

US 2006/0053845 A1    Mar. 16, 2006

(51) Int. Cl.
*E05B 73/00*    (2006.01)

(52) U.S. Cl. .................. 70/18; 70/30; 70/49; 70/58

(58) Field of Classification Search .............. 70/30, 70/49, 18, 19
See application file for complete search history.

(56) References Cited

U.S. PATENT DOCUMENTS

| | | |
|---|---|---|
| 314,985 A | 3/1885 | Young |
| 2,087,420 A | 7/1937 | Wiederholt |
| 2,190,661 A | 2/1940 | Hauer |
| 2,547,967 A | 4/1951 | Patten |
| 2,647,960 A | 8/1953 | Benjamin |
| 2,933,915 A | 4/1960 | Gossner |
| 3,611,760 A | 10/1971 | Muther |
| 3,906,758 A | 9/1975 | Hurwitt |
| 4,044,577 A | 8/1977 | Horlacher |
| 4,086,795 A | 5/1978 | Foster |
| 4,098,099 A | 7/1978 | Smith |
| 4,543,806 A | 10/1985 | Papandrea |
| 4,665,724 A | 5/1987 | Sakai |
| 4,691,539 A | 9/1987 | Gover |
| 4,756,171 A | 7/1988 | Homar |
| 4,896,517 A | 1/1990 | Ling |
| 4,970,882 A | 11/1990 | Arrendondo |
| 5,156,028 A | 10/1992 | Jiang |
| 5,531,083 A | 7/1996 | Franck, III et al. |
| 5,598,727 A | 2/1997 | White |
| 5,832,752 A | 11/1998 | Zeller |
| 5,918,490 A | 7/1999 | Lion |
| 5,960,652 A | 10/1999 | Marmstad |

(Continued)

FOREIGN PATENT DOCUMENTS

DE    35 43 201 A1    6/1987

OTHER PUBLICATIONS

European Search Report dated Jan. 24, 2006.

*Primary Examiner*—Suzanne Dino Barrett
(74) *Attorney, Agent, or Firm*—Quarles & Brady LLP

(57) ABSTRACT

A cable lockout assembly includes a base and a cover. The cover is rotatably fixed relative to the base for rotation about a center axis between a lock position and an unlock position. A cable is wound around the center axis between the base and the cover. The cable has a first end and a second end. The first end is fixed relative to the lockout assembly, and the second end extends from the cable lockout assembly a predetermined length. In the unlock position, the second end is detachably fixable to the cable lockout assembly. In the lock position, when the second end is fixed to the cable lockout assembly, the second end is not detachable from the cable lockout assembly.

31 Claims, 8 Drawing Sheets

U.S. PATENT DOCUMENTS 6,363,758 B1    4/2002   Ling
6,470,718 B1   10/2002   Yang
6,681,603 B1    1/2004   Yu
2006/0169008 A1*   8/2006   Fawcett et al. .............. 70/57.1

* cited by examiner

CABLE LOCKOUT ASSEMBLY

CROSS REFERENCES TO RELATED APPLICATIONS

Not Applicable.

STATEMENT REGARDING FEDERALLY SPONSORED RESEARCH

Not Applicable.

BACKGROUND OF THE INVENTION

The present invention relates to cable lockout assemblies, and more particularly to a simple cable lockout assembly.

It is often desirable to secure various components of an apparatus in a single locked orientation. For example, many factories will include a plurality of large gate valves for controlling high pressure fluid or gas. Manufacturing processes may require ON, OFF, or partially ON gate valves and, improperly adjusted valves may either damage or destroy factory machinery, adversely affect manufacturing processes, or cause safety problems. Other applications where apparatus are advantageously locked in a single orientation include vehicle steering wheels while vehicles are parked, large circuit breakers and cylindrical gas tanks that are often stored in factories, hospitals and restaurants, to name a few.

In each of these applications, the industry has devised various locking mechanisms. One particular mechanism includes a cable and a cable locking mechanism whereby one cable end is secured to the mechanism and the other cable end can be fixed relative to the mechanism forming a loop. Mechanisms using this technique can provide a tight locking loop and, because a long cable can be provided to accommodate any size requirements, these mechanisms are versatile. These mechanisms, however, are often difficult to use or complicated requiring many moving parts or internal key locks. Accordingly, a need exists for a cable lockout assembly including a cable that is uncomplicated and easy to operate.

BRIEF SUMMARY OF THE INVENTION

The present invention provides a cable lockout assembly including a base and a cover. The cover is rotatably fixed relative to the base for rotation about a center axis between a lock position and an unlock position. A cable is wound around the center axis between the base and the cover. The cable has a first end and a second end. The first end is fixed relative to the lockout assembly, and the second end extends from the cable lockout assembly a predetermined length. In the unlock position, the second end is detachably fixable to the cable lockout assembly. In the lock position, when the second end is fixed to the cable lockout assembly, the second end is not detachable from the cable lockout assembly.

A general objective of the present invention is to provide a simple cable lockout assembly including a cable. This objective is accomplished by providing a cable lockout assembly including a base and a cover rotatably fixed to the base for rotation about a center axis. A cable wound around the center axis between the base and cover can be used to lock out a device.

Another objective of the present invention is to provide a cable lockout assembly that is simple to operate. This objective is accomplished by providing a cover that is rotatable about the center axis between a lock position and an unlock position, wherein in the unlock position, the second end is detachably fixable to the cable lockout assembly, and in the lock position, when the second end is fixed to the cable lockout assembly, the second end is not detachable from the cable lockout assembly.

The foregoing and other objects and advantages of the invention will appear from the following description. In the description, reference is made to the accompanying drawings which form a part hereof, and in which there is shown by way of illustration a preferred embodiment of the invention.

DETAILED DESCRIPTION OF THE PREFERRED EMBODIMENTS

Figure 1:
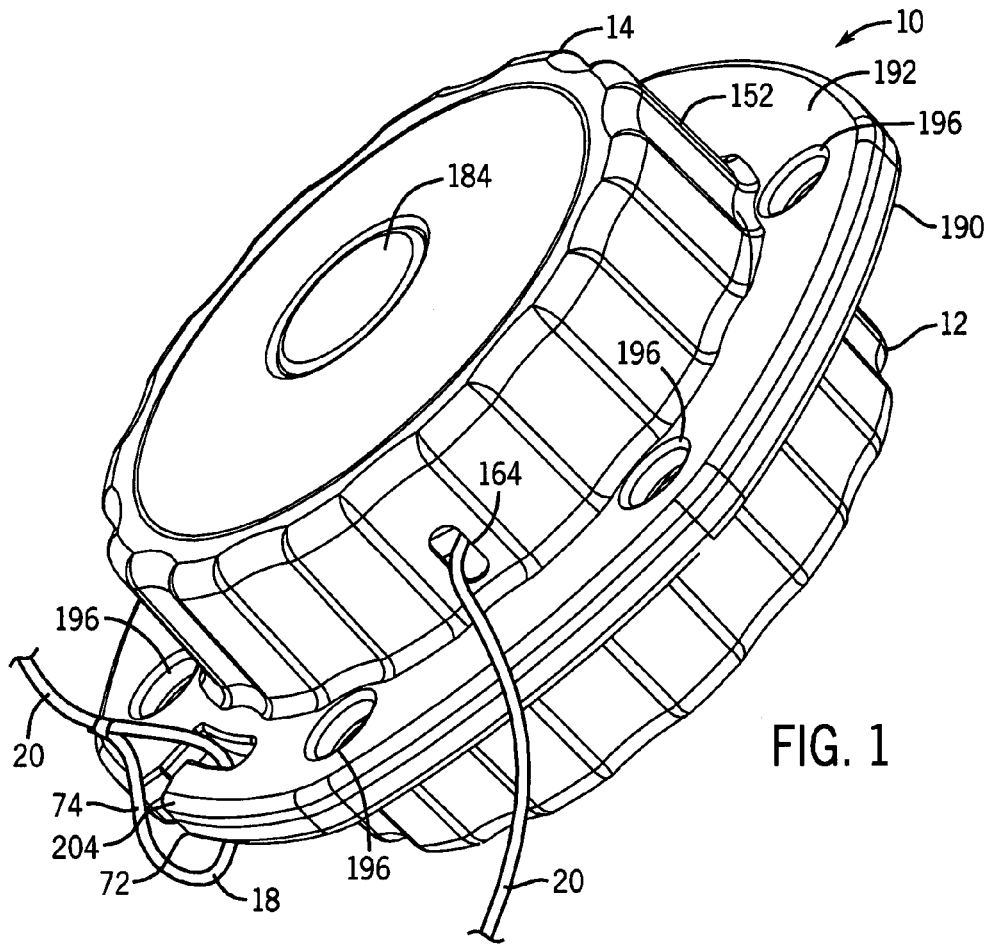
FIG. 1 is a top perspective view of a cable lockout assembly incorporating the present invention.
Figure 2:
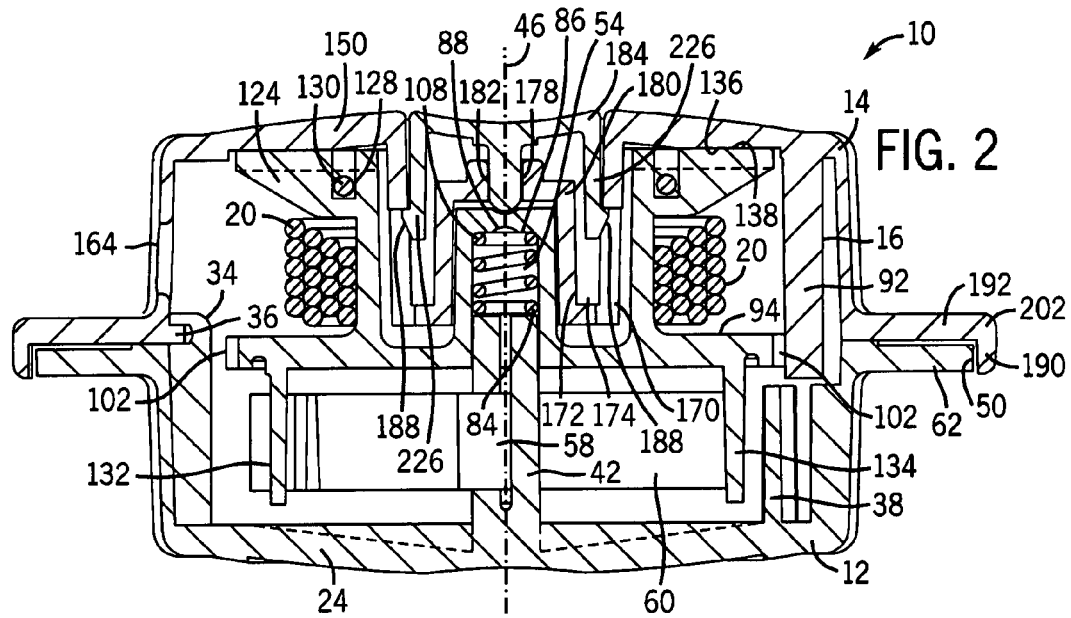
FIG. 2 is a cross sectional view of the cable lockout assembly of FIG. 1.
Figure 3:
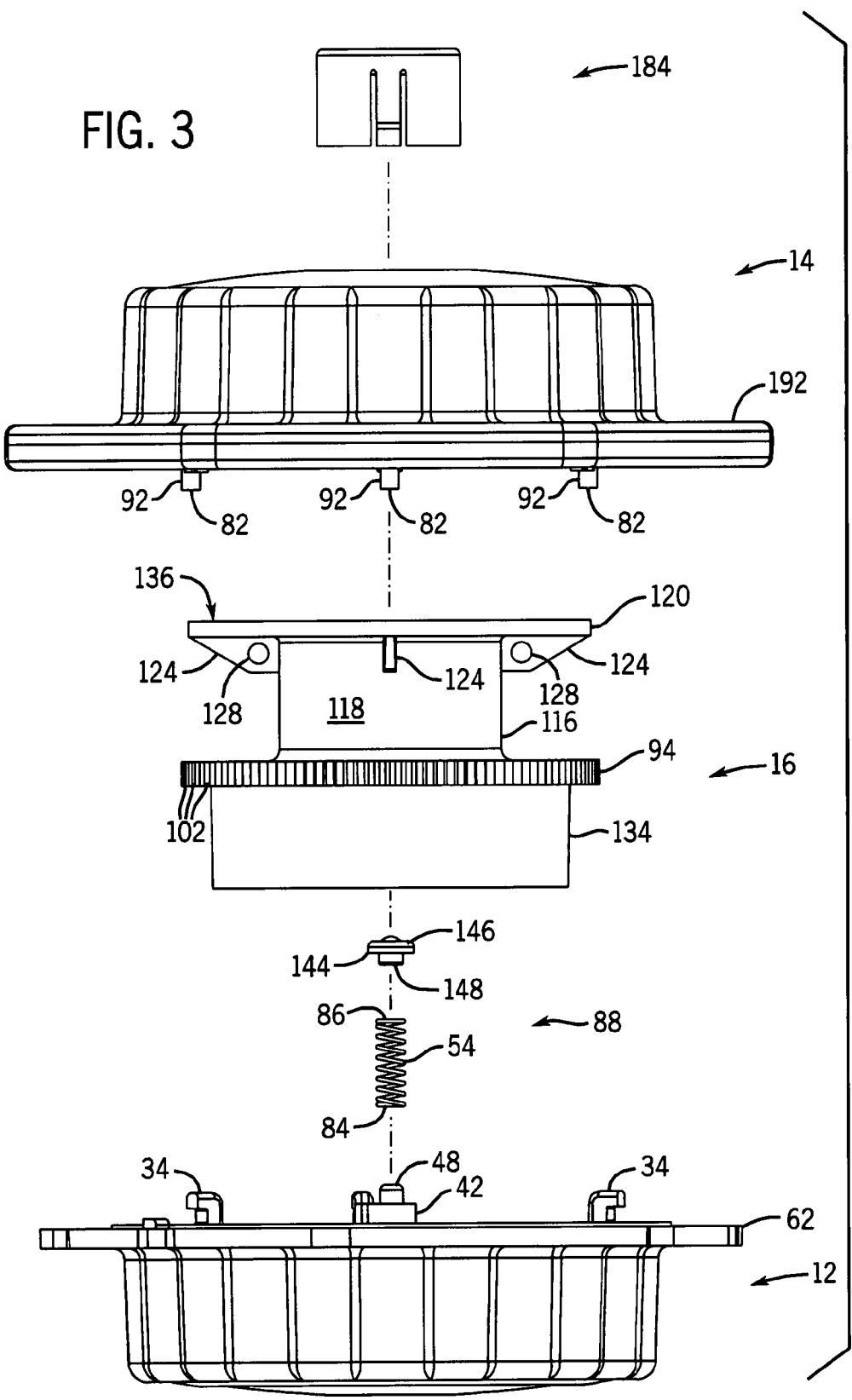
FIG. 3 is a partially exploded view of the cable lockout assembly of FIG. 1.
Figure 4:
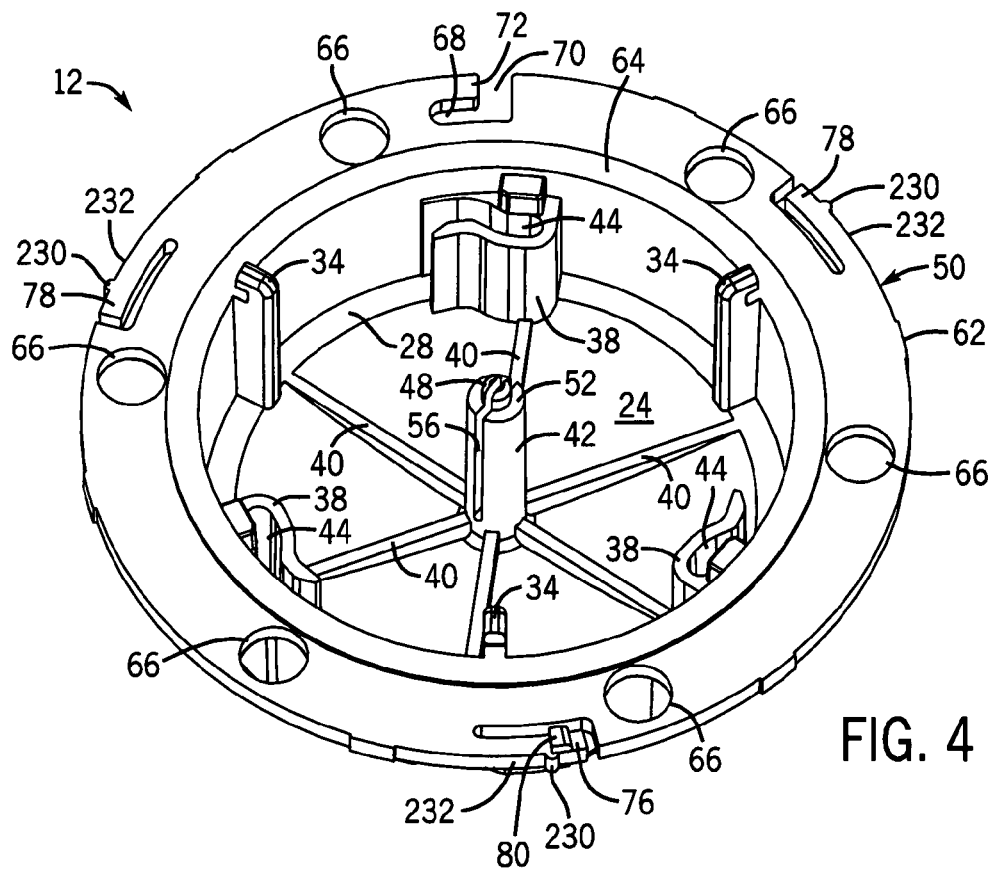
FIG. 4 is a top perspective view of the base of FIG. 3.
Figure 5:
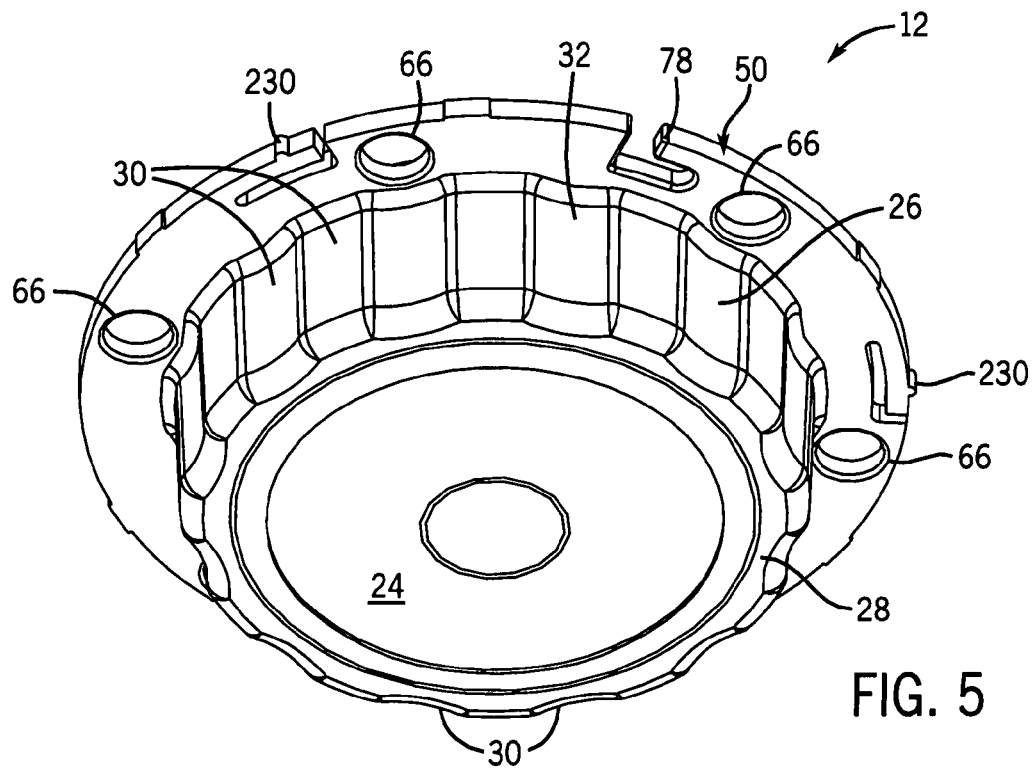
FIG. 5 is a bottom perspective view of the base of FIG. 3.
Figure 6:
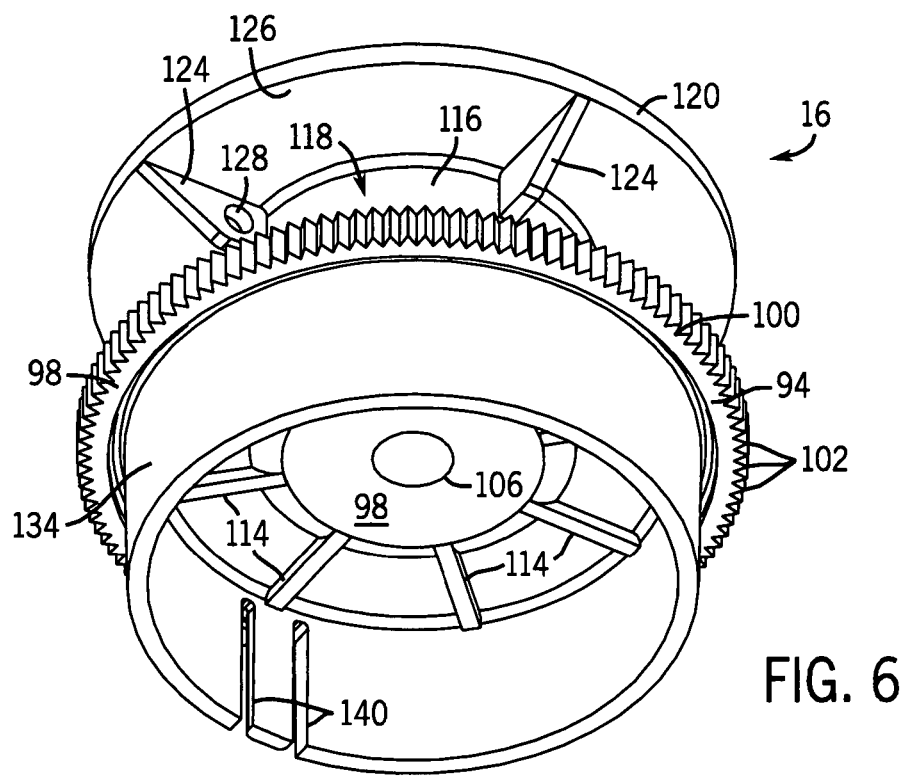
FIG. 6 is a bottom perspective view of the cable reel of FIG. 3.
Figure 7:
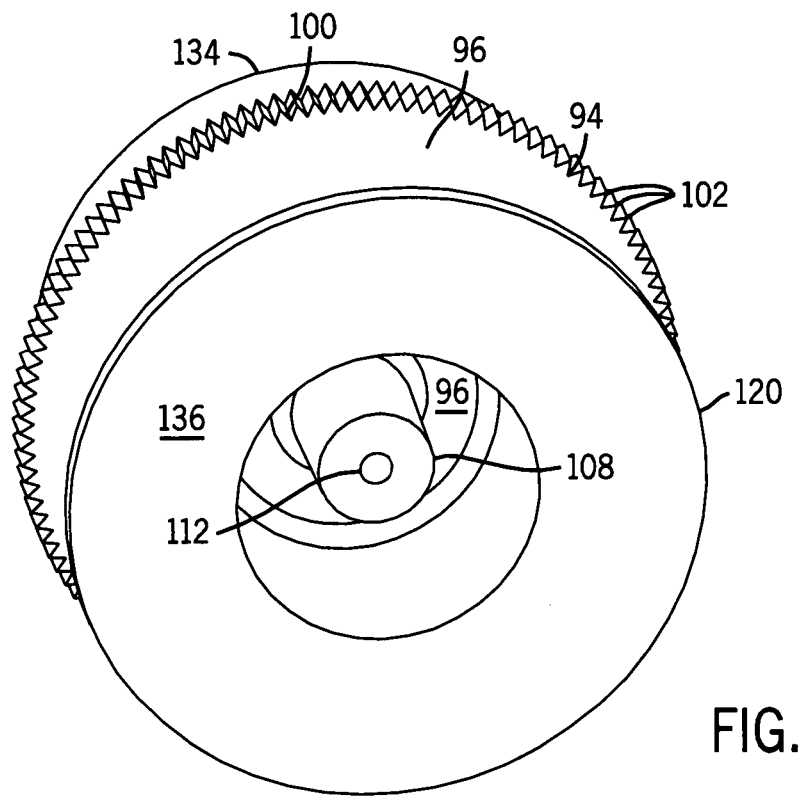
FIG. 7 is a top perspective view of the cable reel of FIG. 3.
Figure 8:
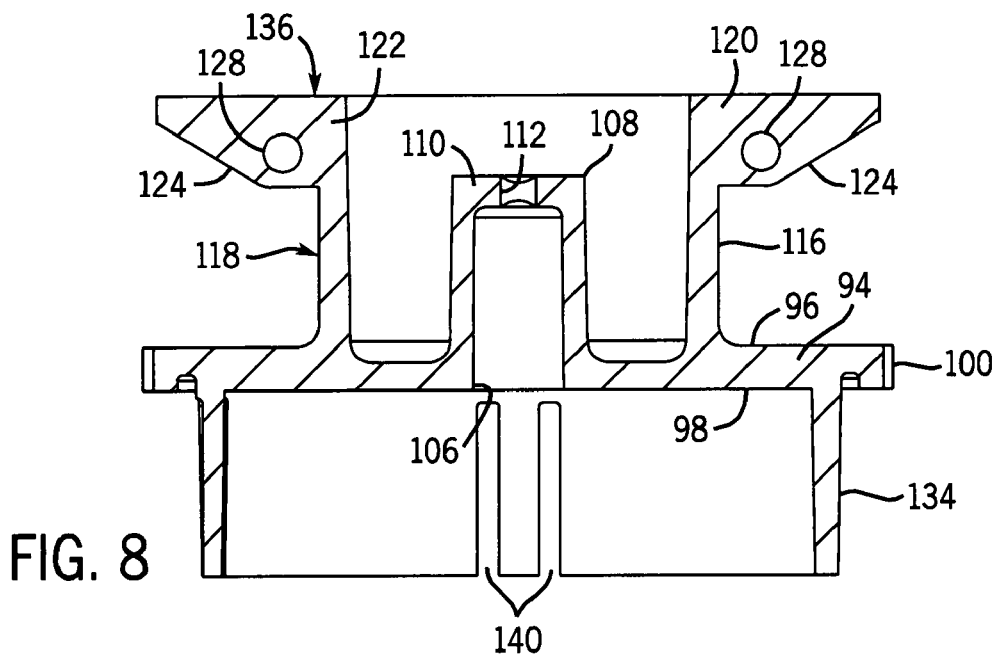
FIG. 8 is a cross sectional view of the cable reel of FIG. 3.
Figure 9:
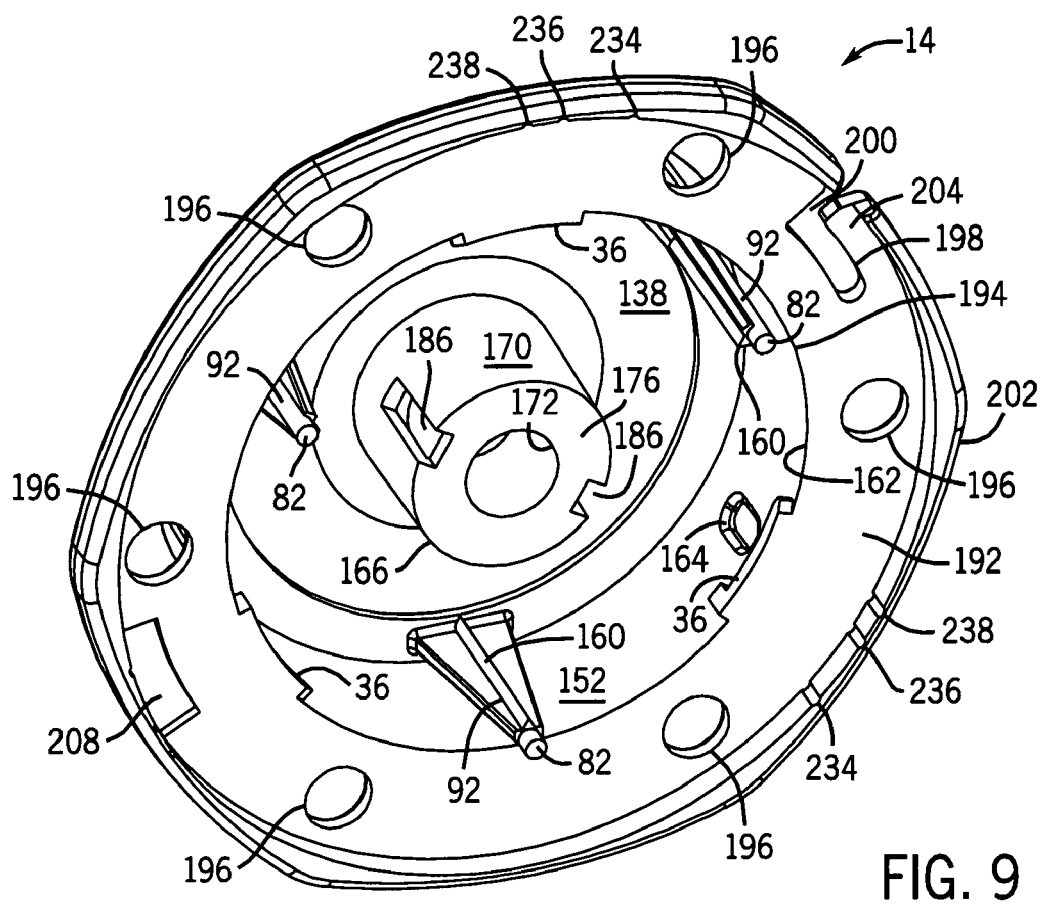
FIG. 9 is a bottom perspective view of the cover of FIG. 3.
Figure 10:
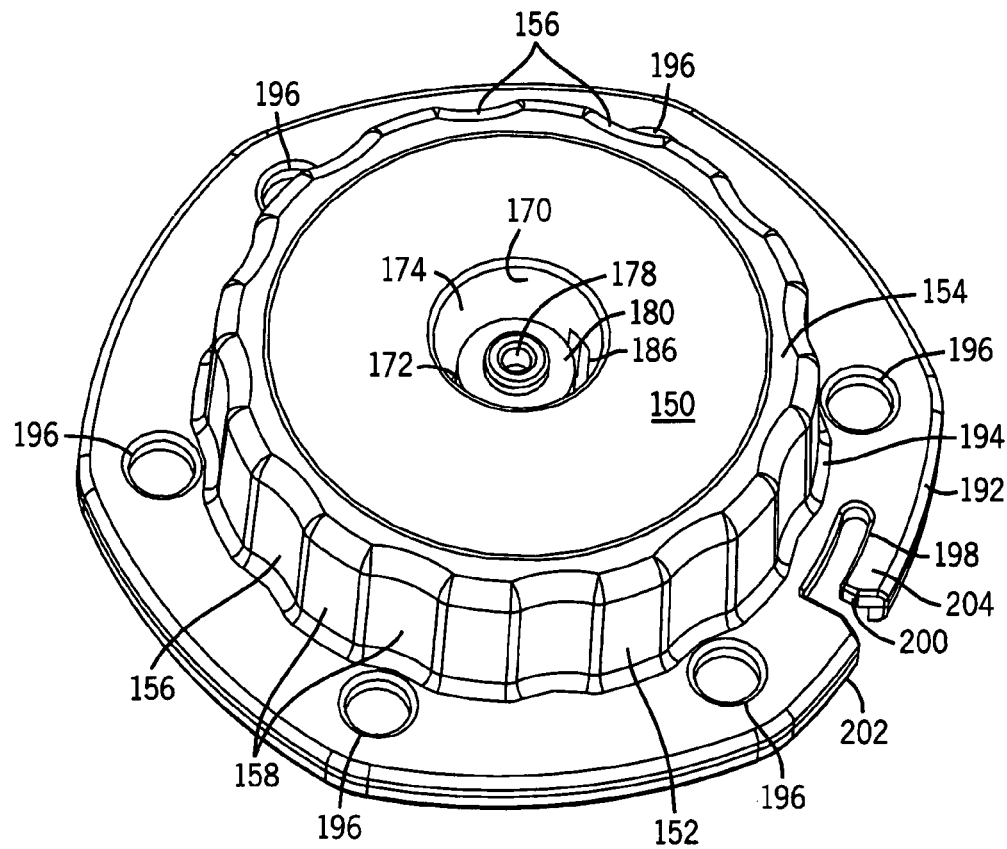
FIG. 10 is a top perspective view of the cover of FIG. 3.
Figure 11:
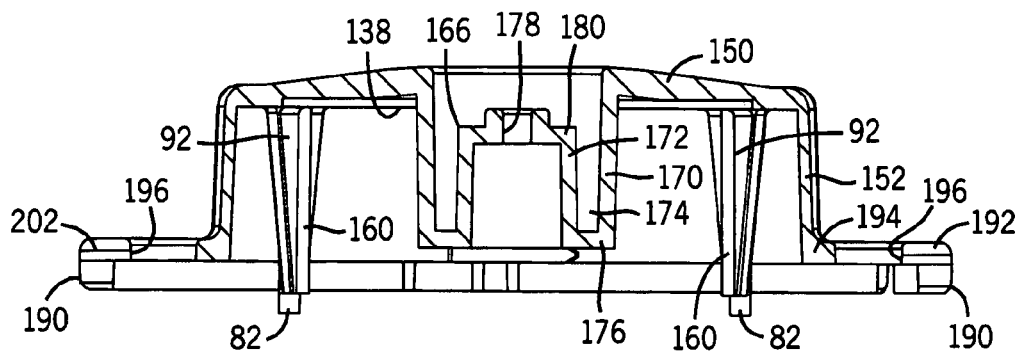
FIG. 11 is a cross sectional view of the cover of FIG. 3.
Figure 12:
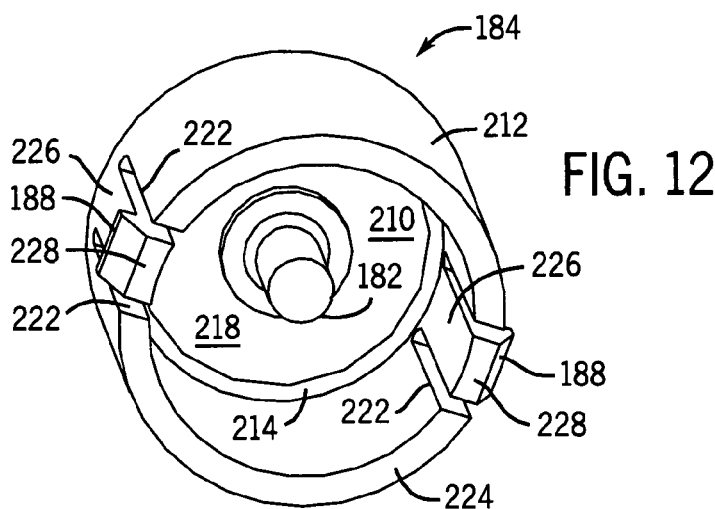
FIG. 12 is a bottom perspective view of the release button of FIG. 3.
Figure 13:
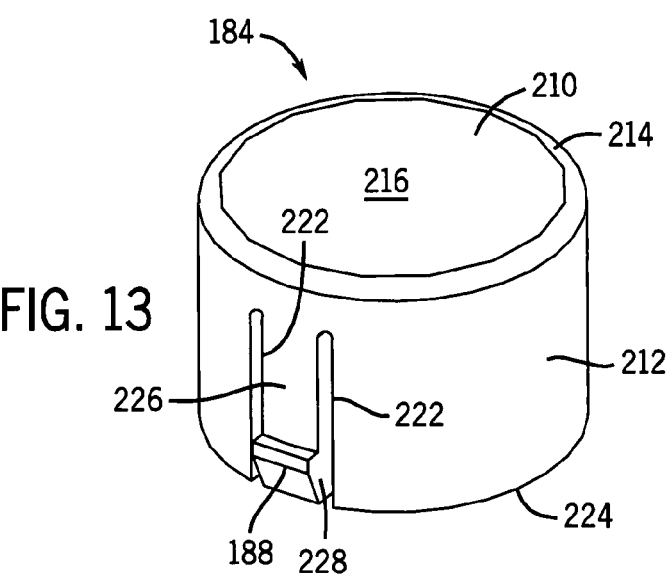
FIG. 13 is a top perspective view of the release button of FIG. 1.
Figure 14:
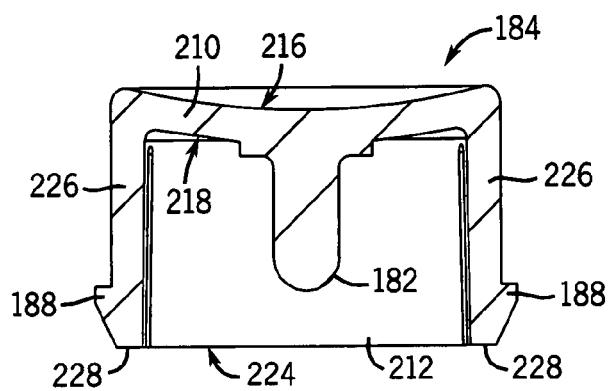
FIG. 14 is a cross sectional view of the release button of FIG. 3.

Referring to FIGS. 1-3, a cable lockout assembly 10 incorporating the present invention includes a base 12 and a cover 14. The base 12 rotatably supports a cable reel 16 enclosed between the base 12 and cover 14. The cover 14 is rotatable relative to the base 12 between an unlocked position (shown in FIG. 1) and a locked position to lock a free end 18 of a cable 20 to the cable lockout assembly 10. Advantageously, the cover 14 is lockable relative to the base 12 to prevent rotation of the cover 14 relative to the base 12 from the locked position to the unlocked position by an unauthorized user to release the free end 18 of the cable 20 from the cable lockout assembly 10.

Referring to FIGS. 1-5 and 9, the base 12 is cup shaped having a bottom wall 24 and a side wall 26. The side wall 26 extends upwardly from the bottom wall periphery 28. A plurality of notches 30 extending longitudinally in the outer circumferential surface 32 of the side wall 26 provides a gripping surface for the user. Outwardly opening hooks 34 circumferentially spaced along the side wall 26 extend upwardly from the bottom wall 24 above the side wall 26, and slidably engage lips 36 extending inwardly from the cover 14 to axially lock the cover 14 relative to the base 12. Radially extending ribs 40 formed in the bottom wall 24 extend from a base center column 42 toward the side wall 26 to stiffen the bottom wall 24. Preferably, the base is formed from molded plastic, however, the base can be formed from any suitable material, such as metal and the like without departing from the scope of the invention. In one embodiment, the base 12 is formed from material having luminescent properties, such as a photoluminescent polymer or molded plastic including a photoluminescent material, such as phosphors, which causes the base 12 to glow in low light areas and enhance visibility of the cable lockout assembly 10.

Hook shaped lock post cams 38 extending inwardly from the side wall 26 are circumferentially spaced along the side wall 26 proximal the bottom wall 24. Each lock post cam 38 includes a camming slot 44 that receives a lower end 82 of a lock post 92 extending downwardly from the cover 14. Upon rotation of the base 12 relative to the cover 14, each camming slot 44 urges one of the lock posts 92 inwardly toward the cable reel 16 to rotatably lock the cable reel 16 relative to the cover 14.

The base center column 42 is coaxial with a center axis 46 of rotation, and extends upwardly from the bottom wall 24 to rotatably support the cable reel 16. A centering post 48 extending upwardly from the tip 52 of the base center column 42 radially centers an axial biasing member 54 extending axially from the tip 52 of the base center column 42 toward the cover 14. A slot 56 formed axially through the base center column 42 and centering post 48 along their lengths secures an inner end 58 of a rotation biasing member 60.

A base flange 62 extending radially from the upper edge 64 of the side wall 26 includes six circumferentially spaced locking apertures 66 for locking the base 12 relative to the cover 14. A circumferentially extending securing slot 68 formed in the base flange 62 intersects a radially extending slot 70 which opens to the circumferential edge 50 of the base flange 62. The slots 68, 70 define a radially opening securing hook 72 that receives a loop 74 formed in the free end 18 of the cable 20. The securing hook 72 is slipped through the loop 74 to secure the cable free end 18 to the base 12.

Three additional hooks 76, 78 are formed in the flange 62. One of the additional hooks 76 includes an upwardly extending protrusion 80 which forms a resilient cantilevered latch that engages the cover 14 to limit the rotation of the cover 14 to a predetermined arc length. A radially extending bump 230 formed on an outer edge 232 of each hook 76, 78 selectively engages detents 234, 236, 238 formed in a circumferential lip 190 forming part of the cover 14. The bumps 230 selectively engage the detents 234, 236, 238 to position the cover 14 relative to the base 12 in one of the locked position, an intermediate position, and the unlocked position.

The axial biasing member 54, such as a helical compression spring, interposed between the base center column 42 and the cable reel 16 supports the cable reel 16 above the base 12 and urges the cable reel 16 toward an upper position. A lower end 84 of the axial biasing member 54 is wrapped around the centering post 48 formed at the tip 52 of the base center column 42. An upper end 86 of the axial biasing member 54 wraps around a bearing 88 that engages the cable reel 16. Although an axial biasing member 54, such as a helical wire compression spring is preferred, any shaped biasing member known in the art formed from a material, such as an elastomeric material, plastic resilient material, and the like, can be used without departing from the scope of the invention.

Referring to FIGS. 2, 3, and 6-8, the cable reel 16 is rotatably supported above the base center column 42 by the axial biasing member 54, and is axially moveable between the upper position and a lower position. In the upper position, the cable reel 16 clutchingly engages the cover 14 to prevent the cable reel 16 from rotating, and thus does not allow the cable 20 to wind onto, or unwind from, the cable reel 16. In the lower position, the cable reel 16 is free to rotate about the center axis 46 to wind the cable 20 onto the cable reel 16 or unwind cable 20 from the cable reel 16.

The cable reel 16 is preferably formed from molded plastic, and includes a disc 94 having an upper surface 96 and a lower surface 98 joined by a circumferential edge 100. Radially extending teeth 102 formed on the circumferential edge 100 engage the lock posts 92 when cover 14 is in the locked position relative to the base 12. A center aperture 106 formed through the disc 94 opens into a hollow cable reel center post 108 extending upwardly from the disc upper surface 96. Ribs 114 formed in the lower surface extend radially from the center aperture 106 toward the disc circumferential edge 100 to stiffen the disc 94.

The base center column 42 extends upwardly into the cable reel center post 108, and is axially spaced from an upper wall 110 of the cable reel center post 108 by the axial biasing member 54. A center aperture 112 formed in the upper wall 110 of the cable reel center post 108 is coaxial with the center axis 46, and receives the bearing 88 engaging an upper end 86 of the axial biasing member 54.

An annular spool 116 extending upwardly from the disc upper surface 96 is radially spaced from the cable reel center post 108 and coaxial with the center axis 46. The spool 116 includes an outer surface 118 which receives the cable 20 wrapped thereon. A flange 120 extending radially outwardly from an upper edge 122 of the spool 116 prevents the cable 20 from slipping off of the spool 116 past the spool upper edge 122. Four gussets 124 formed at the junction of a lower surface 126 of the flange 120 and the spool outer surface 118 stiffen the flange 120. A transverse aperture 128 formed in two of the gussets 124 provides an attachment point for anchoring the stationary end 130 of the cable 20.

The flange 120 has an upper surface 136 that engages a lower surface 138 of the cover 14 in a clutching engagement relation to prevent rotation of the cable reel 16 when the cable reel 16 is in the upper position. Preferably, the flange upper surface 136 is textured, such that frictional engagement of the flange upper surface 136 with the cover lower surface 138 prevents rotation of the cable reel 16 against the urging of the rotation biasing member 60. Although a textured flange upper surface 136 is preferred, the flange upper surface 136 can be smooth, or include structure, such as teeth, ribs, frictional pad, and the like, that clutchingly engages the cover lower surface 138, or structure extending therefrom, without departing from the scope of the invention. Of course, the cable reel 16 can be in clutching engagement With the base 12, or other structure fixed relative to the cable reel 16, to prevent rotation of the cable reel 16 without departing from the scope of the invention.

A skirt 134 extending downwardly from the disc lower surface 98 into the base 12 defines a receptacle substantially coaxial with the center axis 46 for receiving the rotation biasing member 60. A pair of axially extending slots 140 formed in the skirt 134 receives an outer end 132 of the rotation biasing member 60 to fix the outer end 132 relative to the cable reel 16.

The rotation biasing member 60 is wrapped around the base center column 42 in the receptacle defined by the cable reel skirt 134, and rotatably biases the cable reel 16 in a wind direction to wind the cable 20 onto the spool 116. Advantageously, the rotation biasing member 60 provides a self-winding cable reel 16 that will self-wind the cable 20 thereon. Although a rotation biasing member 60 in the form of a ribbon spring having the inner end 58 fixed to the base 12 and the outer end 132 fixed to the cable reel 16 is preferred, any rotation biasing member known in the art, such as a helical spring, leaf springs, and the like can be used. Moreover, the rotation biasing member 60 can be omitted with the cable 20 being wound onto the cable reel 16 using a crank extending through the cover 14 and/or base 12, or manually wound onto the cable reel 16, without departing from the scope of the invention.

The bearing 88 rotatably supports the cable reel 16 above the axial biasing member 54, and has a body 144 including an upper bearing surface 146 and an axial biasing member retention post 148. The upper bearing surface 146 is received partially in the center aperture 112 formed in the upper wall 110 of the cable reel center post 108 to center the cable reel 16 in the base 12 and allow rotation of the cable reel 16 relative to the base 12 and cover 14. The upper end of the axial biasing member 54 wraps around the biasing member retention post 148 to fix the bearing 88 to the axial biasing member 54. Preferably, the bearing 88 is formed from a plastic material to minimize cost, however, the bearing 88 can be formed from any material, such as metal, without departing from the scope of the invention. Of course, the bearing 88 can be omitted at the expense of a less smoothly rotating cable reel 16 without departing from the scope of the invention.

Referring to FIGS. 1-4, and 9-11, the cover 14 is cup shaped having a cover top wall 150 and a cover side wall 152. The cover side wall 152 extends downwardly from the top wall periphery 154 to enclose the cable reel 16. A plurality of notches 156 extending longitudinally in the outer circumferential surface 158 of the cover side wall 152 provides a gripping surface for the user. Lips 36 extending radially inwardly from the lower edge 162 of the cover side wall 152 slidably engage the hooks 34 extending from the base 12 to axially fix the cover 14 relative to the base 12. The cable 20 passes through a cable aperture 164 formed through the cover side wall 152 when the cable 20 is wound onto, or unwound from, the cable reel 16. Preferably the cover 14 is formed from molded plastic, however, the cover 14 can be formed from any suitable material, such as metal and the like, without departing from the scope of the invention. In one embodiment, the cover 14 is formed from a material having luminescent properties, such as a photoluminescent polymer or molded plastic including a photoluminescent material, such as phosphors, which causes the cover 14 to glow in low light areas and enhance visibility of the cable lockout assembly 10.

The cover top wall 150 includes the cover lower surface 138 that clutchingly engages the cable reel spool flange upper surface 136 to prevent rotation of the cable reel 16 when the cable reel 16 is in the upper position. Preferably, the cover lower surface 138 is textured, such that frictional engagement of the flange upper surface 136 with the cover lower surface 138 prevents rotation of the cable reel 16 against the urging of the rotation biasing member 60. Although a textured cover lower surface 138 is preferred, the cover lower surface 138 can be smooth, or include structure, such as teeth, ribs, frictional pad, and the like, that clutchingly engages the flange upper surface 136, or structure extending therefrom, without departing from the scope of the invention.

The resilient lock posts 92 circumferentially spaced along the cover side wall 152 extend downwardly from the cover top wall 150. Each lock post 92 includes a radially inwardly extending tooth 160 that engages the teeth 102 extending radially outwardly from the cable reel 16. Upon rotation of the cover 14 relative to the base 12 toward the locked position, each lower end 82 of each lock post 92 is received in the camming slot 44 of one of the lock posts cams 38. Each camming slot 44 urges the respective lock post 92 inwardly to engage the radially inwardly extending tooth 160 with the teeth 102 extending radially outwardly from the cable reel 16 to lock the cable reel 16 relative to the cover 14.

An annular cover center column 166 extending downwardly from the cover top wall 150 is coaxial with the center axis 46, and includes an outer side wall 170 and an inner side wall 172 which defines an annular space 174 therebetween. The outer side wall 170 extends downwardly from the cover top wall 150 into the annular spool 116, and is joined by a bottom wall 176 to the inner side wall 172. The inner side wall 172 extends upwardly from the bottom wall 176 to a top wall 180. A center aperture 178 formed through the top wall 180 receives a push rod 182 extending downwardly from a release button 184 received in the annular space 174. Diametrically opposed slots 186 formed in the outer side wall 170 and bottom wall 176 of the annular cover center column 166 receive cantilevered protrusions 188 extending from the release button 184.

A cover flange 192 extending radially from the lower edge 194 of the cover side wall 152 includes six circumferentially spaced locking apertures 196 that are alignable with the locking apertures 66 formed in the base flange 62 upon rotation of the cover 14 from the unlocked position to the locked position. The circumferential lip 190 extending downwardly from a circumferential edge 202 of the cover flange 192 covers the base flange circumferential edge 50 to discourage an unauthorized user from prying the cover 14 off of the base 12.

The radially inwardly facing detents 234, 236, 238 formed in the circumferential lip 190 are grouped together into groups of three, and each group is adjacent one of the bumps 230. Each detent 234, 236, 238 in each group is engageable with the adjacent bump 230. The intermediate detent 236 interposed between the other two detents 234, 238 of one group of detents 234, 236, 238 corresponds to the intermediate position of the cover 14 relative to the base 12. Likewise, the other two detents 234, 238 in the group of detents 234, 235, 238 corresponds to one of the cover locked position and unlocked position. Advantageously, the detents 234, 236, 238 selectively engage the bumps 230 extending radially from the base flange 62 to position the cover 14 relative to the base 12 in one of the locked position, intermediate position, and unlocked position.

A circumferentially extending securing slot 198 formed in the cover flange 192 intersects a radially extending slot 200 which opens to the circumferential edge 202 of the cover flange 192. The slots 198, 200 define a radially opening cover securing hook 204 that receives the loop 74 formed in the free end 18 of the cable 20. The cover securing hook 204 is slipped through the loop 74 to secure the cable free end 18 to the cover 14.

The cover 14 is rotatable relative to the base 12 between the locked position and the unlocked position to selectively secure and unsecure the free end 18 of the cable 20 from the securing hooks 72, 204 formed in the base and cover flanges 62, 192. In the cover unlocked position, the cover securing hook 204 overlaps the base securing hook 72, such that the radially extending slots 70, 200 forming both the cover securing hook 204 and base securing hook 72 can be aligned to receive the loop 74 in both securing hooks 72, 204 as shown in FIG. 1, and thus detachably fix the free end 18 of the cable 20 to the lockout assembly 10. Advantageously, upon relative rotation of base 12 and cover 14 to the cover lock position, the radially extending slots 70, 200 misalign to prevent the loop 74 from being removed from both of the securing hooks 72, 204, such that the free end 18 of the cable 20 is not detachable from the cable lockout assembly 10.

A circumferential recess 208 extending along a predetermined arc receives the protrusion 80 extending upwardly from the base flange 62 to limit the relative rotation of the base 12 and cover 14 during normal operation. Advantageously, cantilevering the protrusion 80 allows, upon exertion of sufficient force, the protrusion 80 to ride out of the recess 208 to disengage the base hooks 34 from the cover lips 36 when disassembling the cable lockout assembly 10.

Referring to FIGS. 2, 3, and 11-14, the cylindrical release button 184 is slidably received in the annular space 174 defined between the inner side wall 172 and the outer side wall 170 of the cover center column 166, and engages the cable reel 16 through the center aperture 178 formed through the top wall 180 of the cover center column 166. The release button 184 is axially moveable in the annular space 174 between a release position and a lock position. In the release position, the release button 184 urges the cable reel 16 downwardly against the urging of the axial biasing member 54 and out of engagement with the lower surface 138 of the cover 14 to allow the cable reel 16 to rotate. In the lock position, the release button 184 is urged upwardly by the axial biasing member 54 acting on the cable reel 16, and the cable reel flange upper surface 136 engages the lower surface 138 of the cover 14 to prevent rotation of the cable reel 16.

The release button 184 is cup shaped having a top wall 210 and a side wall 212. The side wall 212 extends downwardly from the top wall periphery 214. The top wall 210 includes a top surface 216 and a bottom surface 218. The top surface 216 is concave for receiving a user's digit depressing the release button 184. The push rod 182 extends downwardly from the bottom surface 218 of the top wall 210 and through the center aperture 178 formed through the top wall 180 of the cover center column 166 to engage the cable reel 16.

The release button side wall 212 extends downwardly into the annular space 174 defined between the center column inner and outer side walls 172, 170. Two pairs of slots 222 extending axially upwardly from a bottom edge 224 of the side wall 212 define diametrically opposed cantilevered arms 226. The protrusions 188 extending into the diametrically opposed slots 186 formed in the outer side wall 170 and bottom wall 176 of the annular cover center column 166 are formed proximate the distal end 228 of the arms 226. Each protrusion 188 extends radially outwardly from one of the arms 226 into one of the slots 186 to limit the travel of the release button 184 between the lock position and the release position. Preferably the release button is formed from molded plastic, however, the cover can be formed from any suitable material, such as metal and the like, without departing from the scope of the invention.

Referring to FIGS. 1-3, the cable 20 can be any type of cable known in the art, such as a sheathed or bare, stainless or nylon cable, and is wrapped around the spool outer surface 118. The cable 20 can have any combination of length and diameter that can be wound onto the spool 116 within the cover 14 and base 12. The stationary end 130 of the cable 20 is fixed to the cable reel 16, such as by having an anchor fixed to the stationary end 130 with the free end 18 of the cable 20 threaded through the aperture 128 formed in one of the gussets 124. Of course, the stationary end 130 can be fixed to the cable reel 16 using any methods known in the art, such as tying, welding, bonding, molding, and the like, without departing from the scope of the invention. The looped free end 18 is threaded through the cable aperture 164 formed through the cover side wall 152 in order to provide access to the free end 18 for the user. Preferably, the free end loop 74 prevents the free end 18 of the cable 20 from being pulled through the cable aperture 164 by the rotation biasing member 60 rotating the cable reel 16.

Referring to FIGS. 1-3, in use, a user can lock a device using the cable lockout assembly 10 by depressing the release button 184 axially downward toward the base 12. Upon depressing the release button 184, the push rod 182 engages the cable reel 16 and urges the cable reel 16 axially downward against the urging of the axial biasing member 54, such that the cable reel flange upper surface 136 disengages from the cover lower surface 138 to allow the cable reel 16 to freely rotate. Once the cable reel flange upper surface 136 disengages from the cover lower surface 138 and the cable reel 16 is free to rotate between the base 12 and cover 14, the user grasps the free end 18 of the cable 20 and pulls the cable 20 through the cable aperture 164 formed through the cover side wall 152 to unwind a desired length of cable 20 from the spool 116 against the urging of the rotation biasing member 60. The user then releases the release button 184 and the axial biasing member 54 urges the cable reel 16 upwardly to clutchingly engage the cable reel flange upper surface 136 with the cover lower surface 138 and rotationally lock the cable reel 16 relative to the cover 14. Advantageously, the axial biasing member 54 also urges the release button 184 upwardly to the lock position.

The length of cable 20 unwound from the cable reel 16 is then engaged with the device being locked, such as by threading the free end 18 of the cable 20 through a valve, circuit breaker, or the like, of the device. Once the cable 20 is threaded through the device being locked, the loop 74 formed at the cable free end 18 is slipped into the securing hooks 72, 204 formed in the cover 14 and base 12. The cover 14 and base 12 are rotated relative to each other toward the cover lock position to secure the loop 74 in the securing hooks 72, 204.

Advantageously, prior to reaching the cover lock position, the user can stop rotating the cover 14 and base 12 relative to each other at an intermediate position in which the loop 74 is secured in the securing hooks 72, 204. In the preferred embodiment, the intermediate position is reached when the radially outwardly extending bumps 230 engage the intermediate detent 236 to physically hold the cover 14 relative to the base 12 in a defined position between the locked position and unlocked position. Of course, the intermediate position can be any position between the locked position and unlocked position without departing from the scope of the invention. Moreover, stopping rotation of the cover 14 relative to the base 12 at an intermediate position is not required to practice the invention.

At the intermediate position, the user can depress the release button 184 downwardly to disengage the cable reel 16 from the cover 14, as described above, to wind excess cable 20 onto the cable reel 16. Once the excess cable 20 is wound onto the cable reel 16, the cover 14 and base 12 are rotated relative to each other further to the lock position in which at least one pair of locking apertures 66, 196 formed in the base and cover flanges 62, 192 is aligned and each lock post lower end 82 engages one of the camming slots 44. Engaging each lock post lower end 82 with one of the camming slots 44 urges each resilient lock post 92 inwardly to engage each radially inwardly extending tooth 160 with the teeth 102 extending radially outwardly from the cable reel 16 to rotatably lock the cable reel 16 relative to the cover 14.

Once at least one pair of locking apertures 66, 196 is aligned, a hasp of a locking mechanism, such as a padlock, is then inserted through the aligned locking apertures 66, 196 and locked to prevent an unauthorized user to rotate the cover 14 relative to the base 12 and release the free end 18 of the cable 20 from the securing hooks 72, 204. Advantageously, more than one user can prevent unauthorized use of the device by inserting additional locking mechanisms through additional aligned locking apertures 66, 196 formed in the base and cover flanges 62, 192.

The user can unlock the device locked by the cable lockout assembly 10 by unlocking the locking mechanism and removing the hasp from the aligned locking apertures 66, 196. The cover 14 and base 12 are then rotated to the cover unlock position to align the radial slots 70, 200 of each securing hooks 72, 204 to release the cable free end loop 74 from the securing hooks 72, 204 and disengage the lower end 82 of each lock post 92 from the camming slots 44 to disengage each radially inwardly extending tooth 160 from the teeth 102 extending radially outwardly from the cable reel 16. The cable 20 is then disengaged from the device being locked, and the release button 184 is depressed to disengage the cable reel flange upper surface 136 from the cover lower surface 138 which allows the rotation biasing member 60 to rotate the cable reel 16 and self-wind the cable 20 onto the spool 116.

Figure 15:
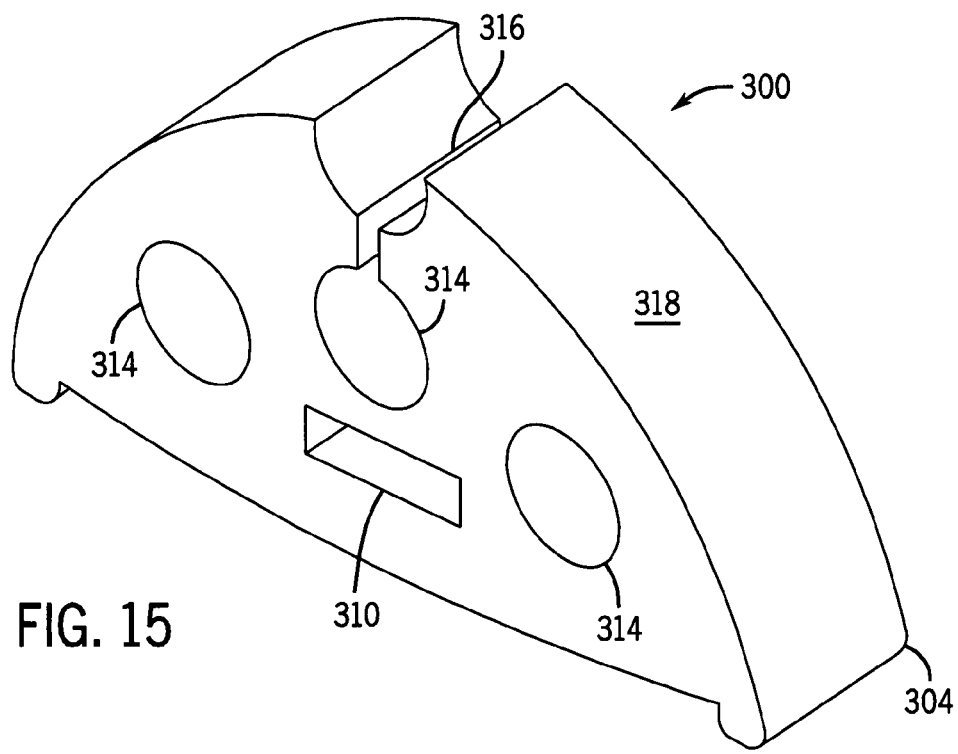
FIG. 15 is a perspective view of a valve handle cable anchor suitable for use with the cable lockout assembly of FIG. 1.
Figure 16:
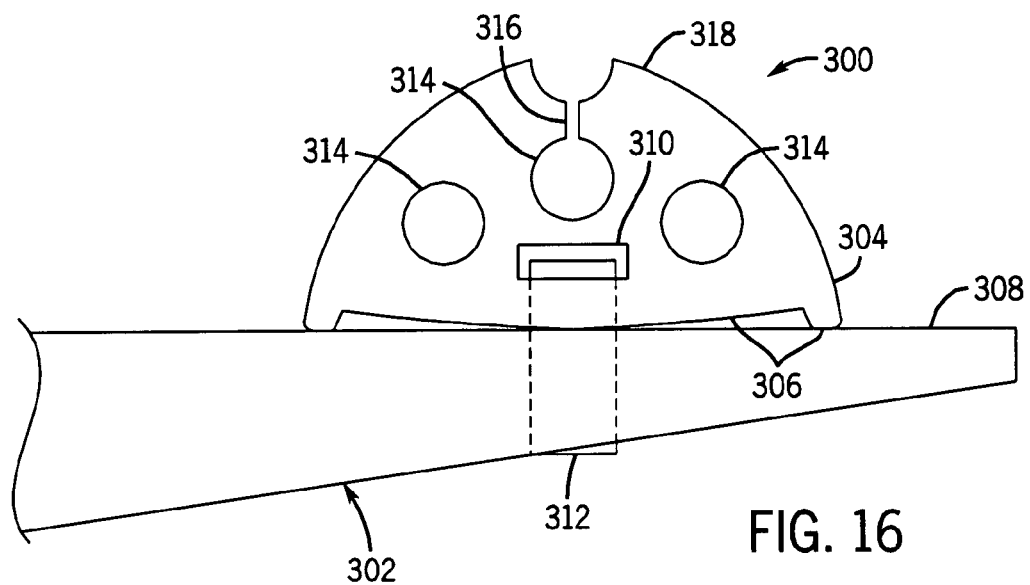
FIG. 16 is an elevation view of the valve handle cable anchor of FIG. 15.

With reference to FIGS. 1, 15, and 16, in another embodiment of the present invention, the cable lockout assembly 10 described above forms part of a kit including one or more lever cable anchors 300. Each lever cable anchor 300 supports the cable 20 from the cable lockout assembly 10 to lock out a device operated by a lever 302, and ensures that the cable 20 does not slip off of the lever 302. Advantageously, in a preferred embodiment, the lever cable anchor 300 remains fixed to the lever 302 to identify the lever 302, and the device connected thereto, which requires locking out.

A preferred embodiment of the lever cable anchor 300 includes a body 304 formed from a nonslip material, such as a rubber/silicon material, using methods known in the art, such as extrusion, molding, and the like. In one embodiment, the body 304 can be formed from a material having luminescent properties, such as a photoluminescent material or rubber/silicon including phosphors, which causes the body 304 to glow in low light areas and enhance visibility of the body 304 to more easily identify the lever 302, and the device connected thereto, which requires locking out.

The body 304 includes an engagement surface 306 that engages a surface 308 of the lever 302. A slot 310, or other shaped aperture, formed through the body 304 receives a tie wrap 312 that secures the body 304 to the lever 302. Of course, other methods for securing the body 304 to the lever 302 can be used, such as adhesives, mechanical fasteners, and the like, without departing from the scope of the invention. Moreover, the body 304 can be overmolded onto the lever 302 without departing from the scope of the invention. One or more throughholes 314 extending through the body 304 receive the cable 20 to fix the cable relative to the body 304, and thus the lever 302, to lock out the device operated by the lever 302. A slot 316 extending from an exterior surface 318 of the body 304 and intersecting one of the throughholes 314 allows a user to slip the cable 20 into the throughhole 314 through the slot 316 when the free end 18 of the cable 20 is already secured.

While there has been shown and described what are at present considered the preferred embodiments of the invention, it will be obvious to those skilled in the art that various changes and modifications can be made therein without departing from the scope of the invention defined by the appended claims.

We claim:

1. A cable lockout assembly comprising:
   a base having a center axis and a first locking aperture;
   a cover rotatably fixed relative to said base for rotation about said center axis between a lock position and an unlock position, said cover having a second locking aperture; and
   a cable wound around said center axis between said base and said cover, said cable having a first end and a second end, said first end being fixed relative to said cable lockout assembly, and said second end extending from said cable lockout assembly a predetermined length, wherein in said unlock position said second end is detachably fixable to the cable lockout assembly, and in said lock position, when said second end is fixed to the cable lockout assembly, said second end is not detachable from the cable lockout assembly and said first and second locking apertures are aligned for receiving a locking mechanism to prevent rotation of said cover relative to said base to said unlock position.

2. The cable lockout assembly as in claim 1, in which said at least one locking aperture is formed through a flange extending from said one of said base and said cover.

3. The cable lockout assembly as in claim 2, in which said flange includes a hook for fixing said second end of said cable to said cable lockout assembly, wherein in said unlock position said second end is engageable with said hook to detachably fix said second end to said cable lockout assembly.

4. The cable lockout assembly as in claim 1, in which said cable is wound onto a cable reel rotatably mounted between said base and said cover for rotation about said center axis.

5. The cable lockout assembly as in claim 1, in which at least one of said base and said cover is formed from a material having luminescent properties.

6. The cable lockout assembly as in claim 4, in which in said lock position, teeth extending radially from said cable reel engage one of said base and said cover to prevent said cable reel from rotating about said center axis to unwind cable therefrom.

7. The cable lockout assembly as in claim 6, in which in said lock position, a lock post forming part of at least one of said cover and said base includes a lock post tooth engaging said teeth to prevent said cable reel from rotating about said center axis to unwind cable therefrom.

8. The cable lockout assembly as in claim 7, in which in said lock position, said lock post engages a lock post cam forming part of the other of said cover and said base to urge said lock post tooth into engagement with said teeth.

9. A cable lockout assembly comprising:
a base having a center axis;
a cover rotatably fixed relative to said base for rotation about said center axis between a lock position and an unlock position; and
a cable wound around said center axis between said base and said cover, said cable having a first end and a second end, said first end being fixed relative to said cable lockout assembly, and said second end extending from said cable lockout assembly a predetermined length, wherein in said unlock position said second end is detachably fixable to the cable lockout assembly, and in said lock position, when said second end is fixed to the cable lockout assembly, said second end is not detachable from the cable lockout assembly, wherein said cable is wound onto a cable reel rotatably mounted between said base and said cover for rotation about said center axis and a rotation biasing member biases said cable reel to wind said cable thereon.

10. A cable lockout assembly comprising:
a base having a center axis;
a cover rotatably fixed relative to said base for rotation about said center axis between a lock position and an unlock position; and
a cable wound around said center axis between said base and said cover, said cable having a first end and a second end, said first end being fixed relative to said cable lockout assembly, and said second end extending from said cable lockout assembly a predetermined length, wherein in said unlock position said second end is detachably fixable to the cable lockout assembly, and in said lock position, when said second end is fixed to the cable lockout assembly, said second end is not detachable from the cable lockout assembly, wherein said cable is wound onto a cable reel rotatably mounted between said base and said cover for rotation about said center axis and said cable reel is axially moveable between a first position and a second position, wherein in said first position said cable reel is prevented from rotation about said center axis to unwind cable therefrom.

11. The cable lockout assembly as in claim 10, in which in said first position, said cable reel is in clutching engagement with at least one of said base and said cover to prevent said cable reel from rotating about said center axis to unwind cable therefrom.

12. The cable lockout assembly as in claim 10, in which an axial biasing member biases said cable reel toward the cable reel first position.

13. A cable lockout assembly comprising:
a base having a center axis and a radially outwardly extending flange, said flange including at least one base locking aperture and base securing hook;
a cover rotatably fixed relative to said base for rotation about said center axis between a lock position and an unlock position, and including a radially outwardly extending flange, said flange including at least one cover locking aperture alignable with said at least one base locking aperture and a cover securing hook alignable with said base securing hook; and
a cable wound around said center axis between said base and said cover, said cable having a first end and a second end, said first end being fixed relative to said lockout assembly, and said second end extending from said cable lockout assembly a predetermined length, wherein in said unlock position said second end is detachably fixable to cable lockout assembly by said base securing hook and said cover securing hook, and in said lock position, when said second end is fixed to said at least one of said cover and said base, said second end is not detachable from said at least one of said cover and said base and said cover securing hook and said at least one cover locking aperture is aligned with said at least one base locking aperture for receiving a locking mechanism to lock said cover on said lock position.

14. The cable lockout assembly as in claim 13, in which said cable is wound onto a cable reel rotatably mounted between said base and said cover for rotation about said center axis.

15. The cable lockout assembly as in claim 13, in which said cable reel is axially moveable between a first position and a second position, wherein in said first position said cable reel is prevented from rotation about said center axis to unwind cable therefrom.

16. The cable lockout assembly as in claim 13, in which at least one of said base and said cover is formed from a material having luminescent properties.

17. The cable lockout assembly as in claim 15, in which in said first position, said cable reel is in clutching engagement with at least one of said base and said cover to prevent said cable reel from rotating about said center axis to unwind cable therefrom.

18. The cable lockout assembly as in claim 13, in which in said lock position, teeth extending radially from said cable reel engage one of said base and said cover to prevent said cable reel from rotating about said center axis to unwind cable therefrom.

19. The cable lockout assembly as in claim 18, in which in said lock position, a lock post forming part of at least one of said cover and said base includes a lock post tooth engaging said teeth to prevent said cable reel from rotating about said center axis to unwind cable therefrom.

20. The cable lockout assembly as in claim 19, in which in said lock position, said lock post engages a lock post cam forming part of the other of said cover and said base to urge said lock post tooth into engagement with said teeth.

21. The cable lockout assembly as in claim 13, in which a rotation biasing member biases said cable reel to wind said cable thereon.

22. The cable lockout assembly as in claim 15, in which an axial biasing member biases said cable reel toward the cable reel lock position.

23. A cable lockout assembly comprising:
a base having a center axis and a radially outwardly extending flange, said flange including at least one base locking aperture and base securing hook;
a cover rotatably fixed relative to said base for rotation about said center axis between a lock position and an unlock position, and including a radially outwardly extending flange, said flange including at least one cover locking aperture alignable with said at least one base locking aperture and a cover securing hook alignable with said base securing hook;
a cable reel rotatably mounted between said base and said cover for rotation about said center axis; and
a cable wound around said cable reel, said cable having a first end and a second end, said first end being fixed relative to said cable reel, and said second end extending from said cable lockout assembly a predetermined length, wherein in said unlock position said second end is detachably fixable to cable lockout assembly by said base securing hook and said cover securing hook, and in said lock position, when said second end is fixed to said at least one of said cover and said base, said second end is not detachable from said at least one of said cover and said base and said at least one cover locking aperture is aligned with said at least one base locking aperture for receiving a locking mechanism to lock said cover on said lock position.

24. The cable lockout assembly as in claim 23, in which said cable reel is axially moveable between a first position and a second position, wherein in said first position said cable reel is prevented from rotation about said center axis to unwind cable therefrom.

25. The cable lockout assembly as in claim 24, in which in said first position, said cable reel is in clutching engagement with at least one of said base and said cover to prevent said cable reel from rotating about said center axis to unwind cable therefrom.

26. The cable lockout assembly as in claim 23, in which at least one of said base and said cover is formed from a material having luminescent properties.

27. The cable lockout assembly as in claim 23, in which in said lock position, teeth extending radially from said cable reel engage one of said base and said cover to prevent said cable reel from rotating about said center axis to unwind cable therefrom.

28. The cable lockout assembly as in claim 27, in which in said lock position, a lock post forming part of at least one of said cover and said base includes a lock post tooth engaging said teeth to prevent said cable reel from rotating about said center axis to unwind cable therefrom.

29. The cable lockout assembly as in claim 28, in which in said lock position, said lock post engages a lock post cam forming part of the other of said cover and said base to urge said lock post tooth into engagement with said teeth.

30. The cable lockout assembly as in claim 23, in which a rotation biasing member biases said cable reel to wind said cable thereon.

31. The cable lockout assembly as in claim 24, in which an axial biasing member biases said cable reel toward the cable reel lock position.

* * * * *